United States Patent
Licea-Kane

(10) Patent No.: US 8,982,134 B2
(45) Date of Patent: Mar. 17, 2015

(54) AREA-BASED DEPENDENCY CHAIN ANALYSIS OF SHADERS AND COMMAND STREAM

(75) Inventor: William W. Licea-Kane, Arlington, VA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 160 days.

(21) Appl. No.: 13/417,889

(22) Filed: Mar. 12, 2012

(65) Prior Publication Data
US 2013/0235057 A1    Sep. 12, 2013

(51) Int. Cl.
*G09G 5/00*  (2006.01)
*G06T 15/00* (2011.01)

(52) U.S. Cl.
CPC ................................ *G06T 15/005* (2013.01)
USPC ........... 345/501; 345/581; 345/553; 345/582; 345/592

(58) Field of Classification Search
None
See application file for complete search history.

(56) References Cited

U.S. PATENT DOCUMENTS

| | | | |
|---|---|---|---|
| 7,616,209 B1 * | 11/2009 | Molnar et al. | 345/545 |
| 2011/0148919 A1 * | 6/2011 | Heggelund et al. | 345/629 |
| 2013/0063473 A1 * | 3/2013 | Pelton et al. | 345/592 |

* cited by examiner

*Primary Examiner* — Tize Ma
*Assistant Examiner* — Yu Chen
(74) *Attorney, Agent, or Firm* — Faegre Baker Daniels LLP

(57) ABSTRACT

A method and device are provided for performing tile based rendering. The method and device analyze past and current commands to determine when tiles are renderable independently of other tiles. In such cases, all rendering passes are performed successively without rendering other tiles in between.

19 Claims, 4 Drawing Sheets

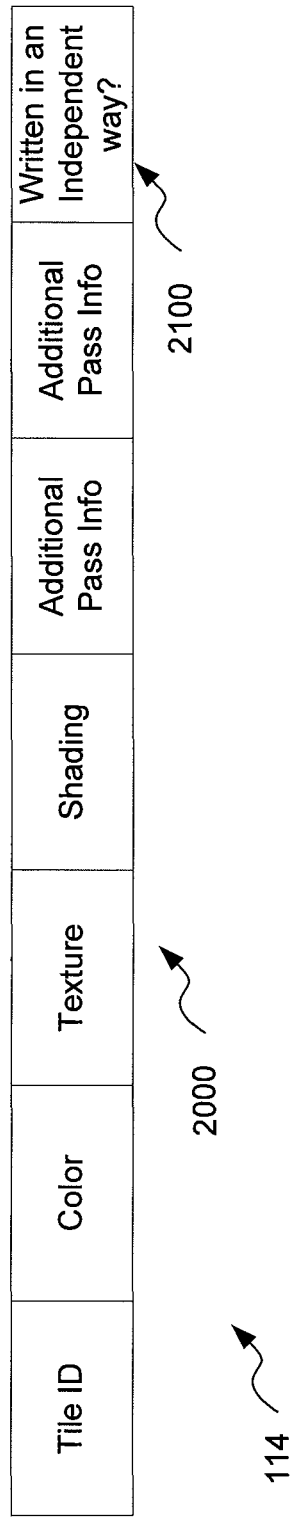

AREA-BASED DEPENDENCY CHAIN ANALYSIS OF SHADERS AND COMMAND STREAM

FIELD OF THE DISCLOSURE

The invention relates generally to systems for processing graphics data and, in particular, to techniques for reducing transfers of data between memory locations during processing of graphics data.

BACKGROUND

In computers and other devices it is known for a first processor (such as a host processor that includes one or more processing cores) to execute one or more applications (for example, graphics applications, word processing applications, drafting applications, presentation applications, spreadsheet applications, video game applications, etc.) that may require specialized or intensive processing. In those instances, the host processor will sometimes call upon a co-processor to execute the specialized or processing-intensive function. For example, if the host processor requires a drawing operation to be performed, it can instruct, via a data element (such as a command, instruction, pointer to another command, group of commands or instructions, address, and any data associated with the command), a video graphics co-processor to perform the drawing function.

Regardless of which processing unit is performing the function, the processing unit accesses memory to perform the tasks assigned to it. Some tasks require memory that is as fast as possible, other tasks require memory that can be slower. Generally speaking, faster memory is more expensive. In addition to speed, power consumption of the memory is also a concern. Accordingly, efficiency concerns encourage that processes for which the slower memory is sufficient utilize the slower memory. Furthermore, efficiency concerns encourage that only as much fast memory be provided as is truly needed. Memory speed is often of importance for storing data that the processor will need to directly access. Slower memory can be used to store data in between times when the processor is expected to need to directly access it. Accordingly, memory setups often contain a smaller amount of faster memory and larger amounts of slower memory. Similarly, use of power-efficient memory, when possible provides advantages and cost savings. In some examples, the fast and/or energy efficient memory is memory that is provided "on-chip." Whereas the slower and/or less energy efficient memory is external to the processing chip.

Drawing operations via rasterization or otherwise, provide that each pixel has a plurality of properties (such as color, depth, stencil, and others). These properties are typically imparted to pixels through command streams that are composed one or more frame buffer operations (such as clear, swap, texture binding), state setting operations, and drawing operations. Each drawing operation imparts properties to the fragments generated by drawing operations through shaders. Shaders may read input streams (vertex buffers or vertex streams, or the results of previous stages of shading), may read memory (uniform or constant buffers), may read textures (texels—a single pixel from a texture map), read and write memory (images load store or unordered access views), write memory (transform feedback or stream output), and may perform additional operations to determine the properties of the fragments. The properties of the pixels may be determined by the properties of the fragments and optionally by the existing properties of the pixel through pixel operations (blending or output merging).

Processing of the command stream dictates that the entirety of the command stream of a pass (delineated by one or more framebuffer operations) must be completed before proceeding to the next pass. Stated differently, every pixel for a given screen must be given its color value for a pass before the processor returns to begin imparting color values to each pixel for the next pass. Drawing operations are formed this way because information in "dependent passes" may be dependent upon the previous pass values of any texel assigned to one or more textures. Accordingly, for each pass that depends upon modified texture color values for its texture reads, the color values of previous textures, in general, must have been previously determined.

The processor imparting the characteristics to the pixels utilizes the smaller faster memory, which as stated previously may be located "on chip." The smaller faster memory is typically not large enough to store an entire screen worth of pixels and all the various dependent attributes therein. Accordingly, the screen as a whole is stored in the larger slower memory. The screen is divided up into "sub-sections" referred to as "tiles." Tiles may include one or more pixels therein. This process is referred to as tiled rendering.

Tiled rendering processes image information to map primitives onto tiles. In a first pass, information about a first tile is pulled from the large memory into the smaller memory. Maps are used to determine a color to be ascribed to the pixels at issue. While it is understood that ascribing features to tiles involves ascribing features to pixels, the below discussion discusses ascribing features to tiles in that pixels within a tile are processed together with other pixels within the tile. Once color is assigned, the tile with its associated color is written back to the large memory, via a swap buffer operation or otherwise. The processor then moves on to the next tile by calling for it to be pulled from the large memory into the small memory. Color is then assigned to the second tile, followed by the tile being sent back to the large memory. This is repeated for all needed tiles (all needed tiles may be those for all of a screen if a full screen is to be presented or for portions of the screen if part of the screen is being rendered, such as in interlacing or in embodiments where multiple processors each are responsible for portions of the screen.) Subsequently, each tile is again called from the large memory to the small memory to have subsequent, dependent, passes applied to the pixels in each of the tiles (texture, shading, etc.). Once all attributes are applied to all the tiles, the large memory has a completed screen (or screen portion) therein. This screen can then be sent to be rendered on a physical display (CRT, LCD, etc.).

Accordingly, there is a large amount of transfer of tile data between the two memory sites. The transfers take time and power. Thus, what is needed is a tiled rendering operation that reduces the transfers of data while also not requiring a significant increase in the amount of "faster memory" used to assign attributes to tiles.

BRIEF DESCRIPTION OF THE DRAWINGS

The invention will be more readily understood in view of the following description when accompanied by the below figures and wherein like reference numerals represent like elements:

FIG. 4 is a schematic illustration of a data element in accordance with an embodiment of the present invention.

DETAILED DESCRIPTION OF PREFERRED EMBODIMENTS

Briefly, the present disclosure provides a technique for tile-based processing of graphical data elements where a tile's status as being dependent or independent of adjacent tiles is noted. This notation, in some cases, allows for processing that would typically be performed via multiple passes (such as render to texture/read from texture, deferred shading, post processing effects, and order-independent transparency), that would otherwise require the data to be shuttled between memory units between each pass, to be "collapsed" into a single pass. Such collapsing allows two or more passes for a tile to be performed consecutively without offloading the data in between. In particular, the host processor first processes a screen of tiles in the traditional manner. During this processing, the host processor performs the additional step of determining which tiles are described in a manner that makes their values independent on adjacent tiles. In a subsequent screen rendering, when processing a tile, the processor determines whether the tile has the notation data stating that it was described in a manner that makes its value independent of adjacent tiles. The processor, also called a shader which executes shader code, then determines whether the incoming command stream is describing data that is independent of adjacent tiles. With the knowledge that the previous tile data was saved in a way that is independent of adjacent tiles and that the incoming command stream for the tile is independent of adjacent tiles, the processor knows that all passes for this rendering of the tile can be collapsed into a single rendering pass.

Figure 1:
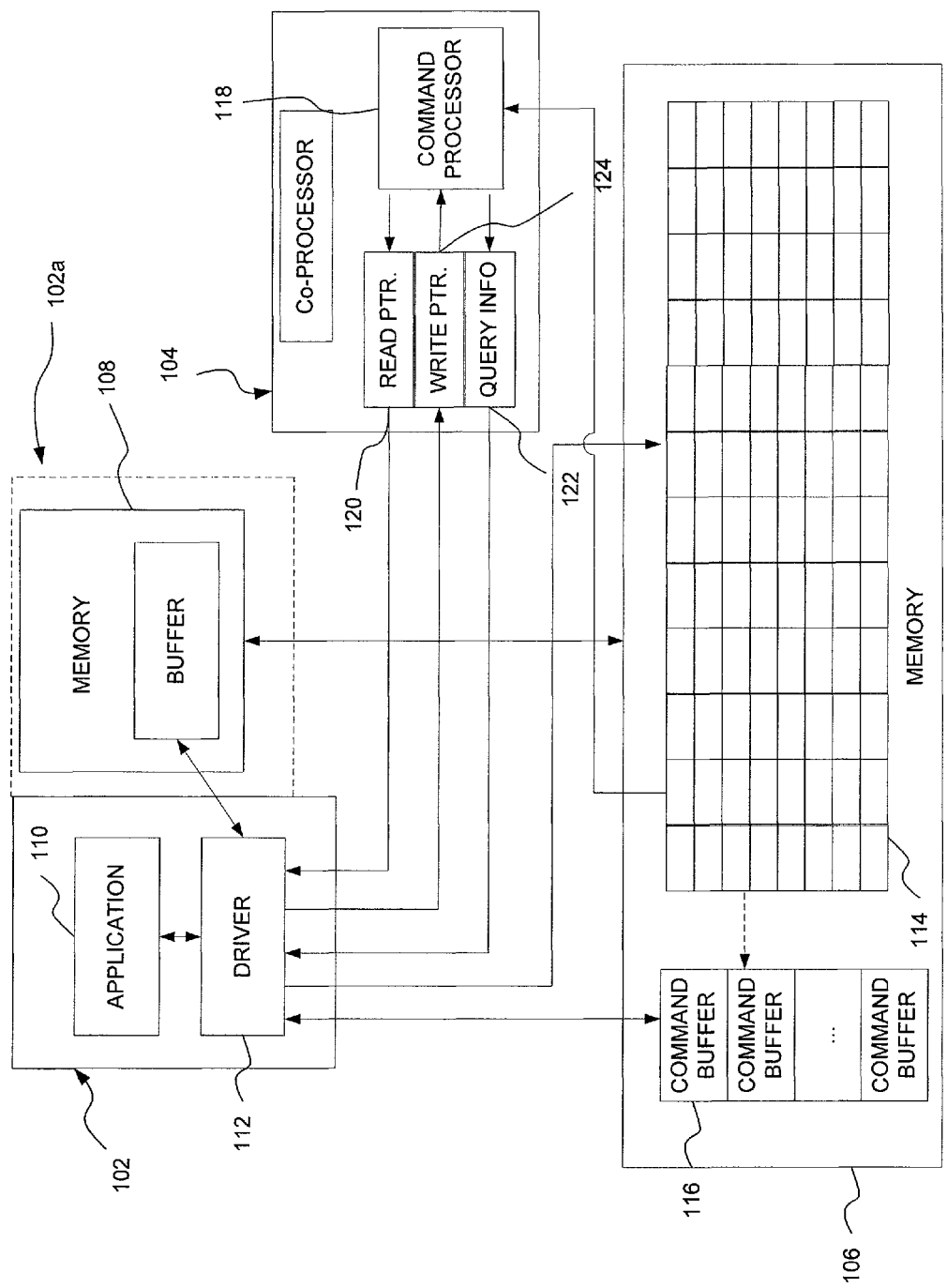
FIG. 1 is a schematic block diagram of a processing system in accordance with an embodiment of the present invention.

Referring now to the Figures, FIG. 1 is a schematic block diagram of a system in accordance with an embodiment of the present invention. In particular, the system 100 includes a processor 102, a co-processor 104 and memory 106. The system 100 may constitute a portion of any device that renders graphical information such as, but not limited to, graphics cards, offline renderers, printers, print engines, digital cameras, portable wireless communication devices, personal digital assistants, etc. Additionally, the techniques described herein can be implemented by processors that execute graphics programs such as Adobe Photoshop and web browsers.

The host processor 102, as known in the art, may comprise any device capable of executing stored instructions and operating upon stored data such as a microcontroller, a microprocessor, a digital signal processor, or combinations thereof or any other suitable structure. In a similar vein, the co-processor 104 may comprise any one or a combination of such processors, or one or more suitably configured programmable logic arrays such as an application specific integrated circuit (ASIC), a graphics processor (with one or more processing cores, discrete logic circuits or any suitable structure. As shown, the memory 106 may be accessed by either the host processor 102 or the co-processor 104 or both and may comprise any storage medium suitable for the storage of data and/or executable instructions such as volatile or non-volatile memory. An additional memory device 108, which preferably comprises cacheable volatile or non-volatile memory, is configured to be accessed by the host processor 102. Embodiments are specifically envisioned in which memory 108 is "on chip" memory, as illustrated via dashed line 102a representing that memory 108 is on board processor 102. Those having ordinary skill in the art will appreciate that other configurations of a host processor 102/102a, co-processor 104, memory 106, and memory 108 may be equally employed.

In operation, the host processor 102 implements one or more applications 110 (only one shown). As further known in the art, each application 110 having a need to communicate data elements for further processing by the co-processor 104 may communicate with a driver element 112. Both the application 110 and driver 112 are preferably implemented as stored software routines that are subsequently executed by the host processor 102 using known programming techniques. In operation, the driver 112 provides the application 110 access to one or more command buffers 116 stored in memory 106. Typically, when the application 110 desires to have certain processing carried out, it first populates a command buffer 116, through the driver 112, with data elements that may be properly processed by the processor 102 or co-processor 104. The application 110 requests the driver 112 to process the data elements previously written into the command buffer.

Figure 2:
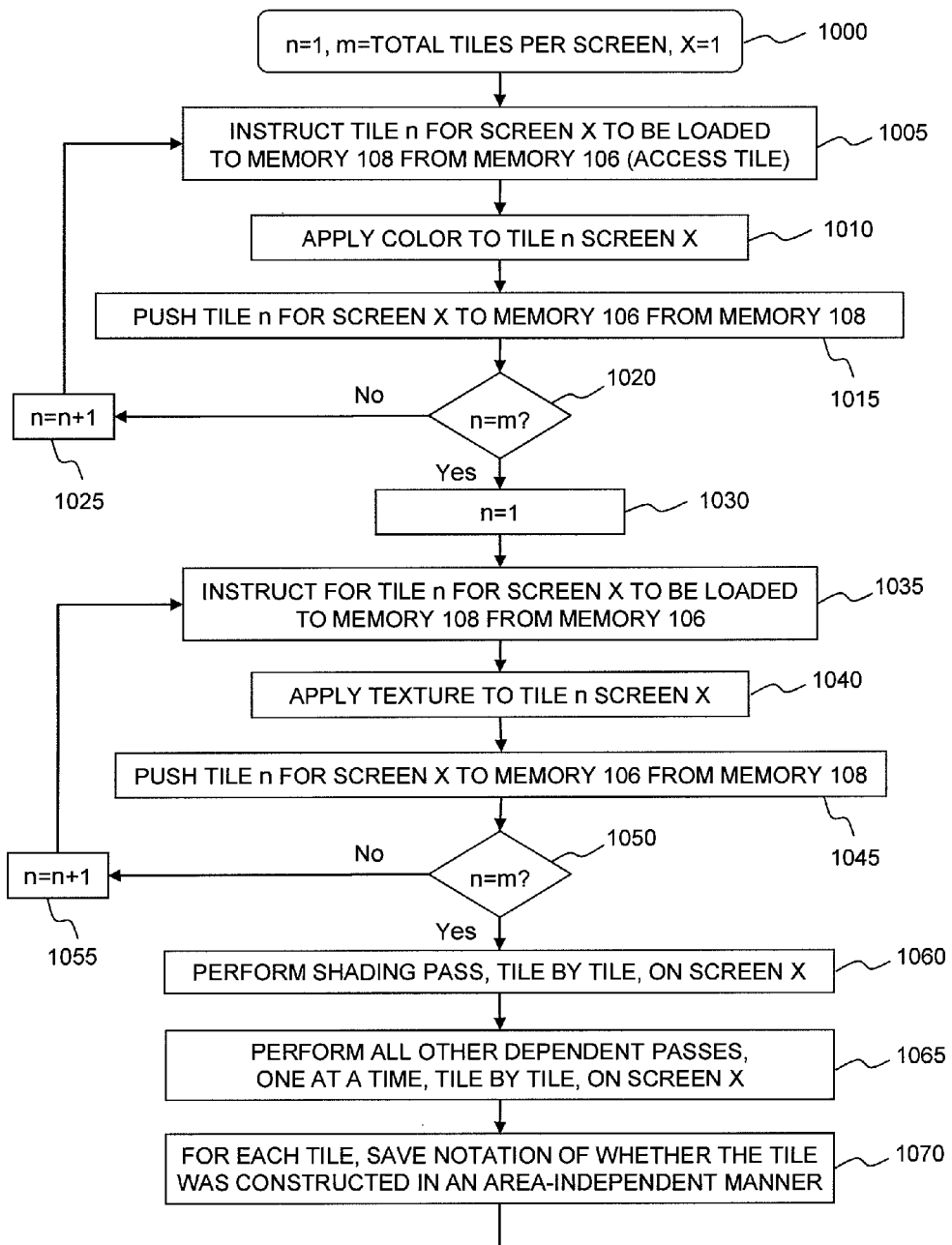
FIGS. 2 & 3 are a flowchart illustrating processing of a set of tiles in accordance with an embodiment of the present invention.
Figure 3:
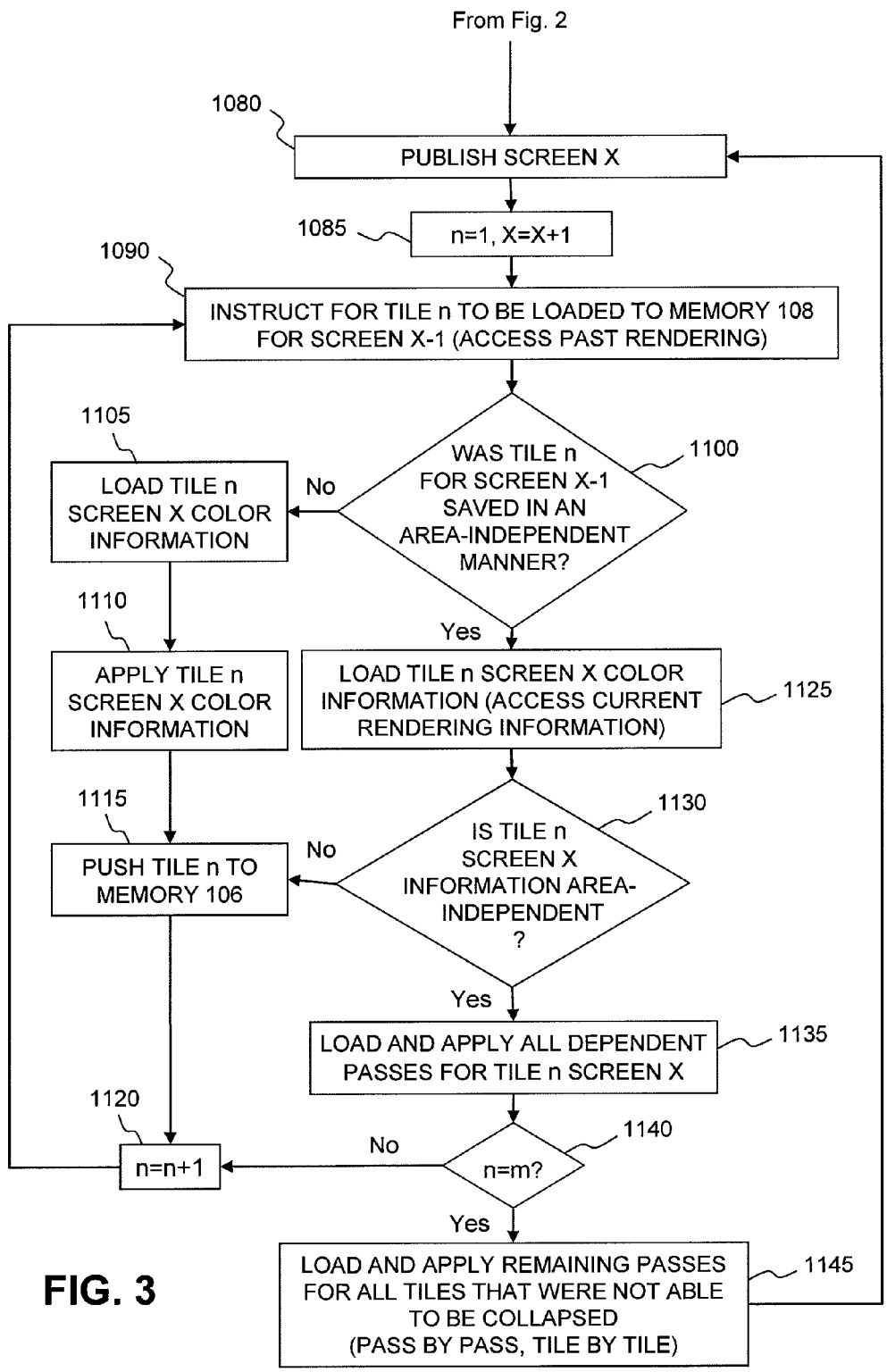

Memory 108 is faster and/or provides energy efficiency relative to memory 106. Memory 108 may be organized as register sets, as caches, as specific framebuffer memory, as stacked memory, or other organizations. As noted previously, memory 108 is generally more expensive than memory 106. Accordingly, memory 106 is larger than memory 108 (more of the relatively less expensive memory is employed). Memory 108 is used for quick access by processor 102, and memory 106 is used to store data between times when it is needed by processor 102. Having described the hardware with reference to FIG. 1, the process of the present invention will now be discussed with reference to FIGS. 2 & 3.

The process of the present disclosure, in one example, is implemented using a general purpose or specialized processor (such as the host processor 102) operating under the control of executable instructions that are stored in volatile or non-volatile memory such as RAM or ROM or any other suitable storage element. Further still, as those of ordinary skill in the art will readily appreciate, the combination of hardware and software components may be equally employed.

For rendering a screen image, the process of tiled rendering is known in the art. Briefly, whereas memory 106 is large enough to store all of the data for a screen image, interaction of processor 102 with memory 106 is slower than interaction with memory 108. However, memory 108 is not large enough to hold all the data for a screen image. Accordingly, the screen is broken up into segments called tiles 114. Memory 108 is large enough to hold all the image data for one or more tiles 114. The increased speed in accessing memory 108 vs. accessing memory 106 is enough to justify the time and power necessary to allow transferring data between memory 106 and 108 for use by processor 102. However, anything that can be done to lessen the time and power associated with data transfers between memory 106 and memory 108 provides additional efficiencies during the creation of the screen.

Accordingly, the method and device of the present disclosure recognizes that not all tiles 114 are dependent upon adjacent tiles 114. Thus, some tiles 114 represent areas that are independent of other areas. The present method and device provides for treating such independent tiles 114 differently to minimize transfers of tile information between memory 106 and memory 108. The method is discussed with reference to FIGS. 2 & 3.

As shown in initiation step 1000, tile number is represented by n and initiated at 1, m=the total number of tiles 114 for the screen to be drawn, and x=the screen to be drawn, initiated at 1. Processor 102 instructs that tile information for tile n, screen x be loaded into memory 108 from memory 106. (step 1005) For screen 1, traditional tile 114 based rendering is performed by shuttling data between memory 108 and 106. Steps 1000-1065 represent steps performed as part of the traditional tile based rendering. However, starting with step 1070, and as illustrated in FIG. 4, data structure 2000 provides a memory allocation 2100 for each rendered tile 114 to indicate whether the tile 114 was rendered, and subsequently saved in memory 106 (or elsewhere) in a manner that is independent of adjacent tiles 114 or whether the rendering of the tile 114 depends on the rendering of adjacent tiles 114. The completed screen is then exported for publishing or any other desired purpose. (Step 1080).

The process then increments screen number to begin work on screen #2 (the tile counter is re-set to start again with tile #1). (Step 1085). Step 1090 calls for tile 1 data from the previously rendered screen to be loaded into memory 108. Processor 102 then checks to see if the counter indicating that tile 1 (114) for the previously rendered screen was saved in an area independent form is activated. (Step 1100) If processor 102 determines that the tile 114 was not previously rendered and saved in an area independent form, then the processor knows that traditional tile based rendering must be applied to the tile 114. Accordingly, color information for the tile 114 is loaded (1105) and applied (1110) to the tile 114 being rendered. The tile 114 is then pushed to memory 106 (1115) and the tile 114 counter is incremented (1120). Processor 102 then moves on to process the next tile 114.

However, if the processor, as shown in block 1100 determines that the counter of tile 1 for the previously rendered screen was saved in an area independent form is activated, then the information for the corresponding tile 114 in screen 2 is loaded (1125) and checked to see if it describes tile 1, screen 2 in an area independent format (1130). As an example, to do this, for the shader, it is noted that a texture fetch is derived from a screen position (gl_Fragcoord, SV_Position, etc). When a rendered texture is bound to a texture unit/sampler, previous stored state data is compared to current state. This comparison allows for a determination of whether the texture fetch instruction only fetches from the earlier rendered pixel. More generally, the comparison allows for a determination of whether the texture fetch instruction only fetches from texels in the already rendered tile of the texture. If is determined that the texture fetch instruction only fetches from texels in the already rendered tile of the texture then it is known that the data for that tile for that screen is area independent.

If the data for tile 1, screen 2 describes it in an area independent format, then all dependent passes for tile 1, screen 2 are also known to be in an area independent format. Processor 102 then renders tile 1, screen 2 by performing all dependent passes before exporting the fully rendered tile to memory 106. Such performing of all dependent passes is otherwise referred to as "collapsing" the passes into single memory transfer iteration. Stated differently, the dependent passes, which would normally involve a transfer back and forth between memory 106 and memory 108 for each pass, instead collapse all the passes into a single event where a single transfer of the tile 114 from memory 106 to memory 108 (and them back) achieves a fully rendered tile 114. It should be appreciated that time is saved by being able to forgo subsequent transfer of the tile information for each subsequent pass for the screen at issue. The tile counter is then incremented until all tiles 114 are treated (some fully via collapsing the passes, some only for the first order pass). For all tiles 114 where only the first order pass was rendered subsequent passes are performed to render the tiles in the traditional way. (1145). Again, for each tile 114 rendered, a notation is saved indicating whether the tile 114 was constructed in an area independent manner (1070).

The above disclosure discusses two conditions for a tile 114, being area independent of adjacent tiles 114, or being dependent on at least one adjacent tile 114. Embodiments are also envisioned where some number of tiles 114 greater than one are noted as being dependent upon each other, but otherwise independent of all other tiles 114. One example would be where two adjacent tiles 114 impact each other, but are independent of all other tiles 114. The present disclosure envisions methods and devices where both tiles 114 are able to be loaded into memory 108 together and simultaneously dependently rendered via all applicable dependent passes. Thus, tiles 114 with limited dependency can still be fully rendered using only one transfer between memory 106 and memory 108. The ability to render such tile "clusters" is at least partially dependent upon memory 108 being of a size to accommodate all the tiles 114 in the cluster.

While the above description discusses rendering a first screen followed by a second screen, it should be appreciated that the second screen may actually be a third (or other) screen that is presented to a viewer. In embodiments where multiple rendering processors are utilized, each rendering processor may be responsible for alternating screens (or every third screen, etc.). In the above described system and method, it should be appreciated that tiles 114 containing pixels for displaying non-moving objects are the most likely to provide the conditions necessary to allow collapsing of the passes. However, the ability to collapse passes is not exclusive to tiles 114 showing non-moving objects.

Additionally, in certain embodiments, the determination of collapsibility of one tile 114 also indicates that adjacent tiles 114 are collapsible. In such embodiments, the steps that are provided exclusively for determining collapsibility of the adjacent tiles 114 can be skipped. Examples of when this would be the case include situations where a texture fetch is called that depends only on the value of gl_Fragcoord/SV_Position and trivial transformations such as where the y coordinate is flipped.

While the above description describes rendering to texture, the above process can also be used in systems that utilize atomic operations. In such atomic operation systems, each pixel can be analyzed to determine whether rendering thereof is truly dependent upon other pixels or whether the pixel being rendered can stand on its own.

By way of example, application of the present disclosure to a system that utilizes atomic operations is now described. In a first pass, an atomic operation (such as an add) is used to generate a pixel specific offset into an image load store buffer/unordered access view. An atomic exchange is then performed such that the offset is placed into a screen sized image load store buffer (a pointer to an end of a linked list) that is addressed with gl_FragCoord/SV_Position (a headOffset buffer). Subsequently, another image load store buffer is presented that contains a pointer to the data that was earlier stored in the list and to data store records (a dataStore buffer). Each of the headOffset buffer and dataStore buffer are then marked as dirty (as containing data which needs to be written back to a larger memory). It is then determined how the buffers were addressed (for headOffset an "independent" read/write from gl_FragCoord/SV_Position), that each entry in the texture contains a pixel unique value, and that the chained analysis of the dataStore proves that all data will be valid within that chain. In a subsequent second pass, a shader accesses the headOffset buffer with gl_FragCoord/SV_Position. If the shader only needs to access the headOffset buffer and valid data within dataStore buffer, then it is known that the pass can be collapsed.

The above detailed description and the examples described therein have been presented for the purposes of illustration and description only and not for limitation. For example, the operations described may be done in any suitable manner. While the cases above have described render to texture and atomic operations as utilizing the ability to collapse passes, there are other cases where the principles could be applied that would be evident to one of skill in the art (such as collapsing transform feedback/stream output). The method steps may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. In a system comprising a processor performing tiled rendering, a method comprising:
   determining whether a past rendering of a first tile was performed in a manner that was independent from rendered values of adjacent tiles;
   determining whether information for a present rendering of the first tile describes the first tile in a manner that is independent from rendered values of adjacent tiles, the present rendering being for a different frame than the past rendering; and
   responsive to a determination that both the past rendering was performed in a manner that was independent from rendered values of adjacent tiles and the present rendering of the first tile describes the first tile in a manner that is independent from rendered values of adjacent tiles, performing all applicable dependent passes for the first tile for the present rendering before performing any rendering passes on any subsequent tile.

2. The method of claim 1, wherein all applicable dependent passes are performed for the first tile for the present rendering before performing any rendering passes on any subsequent tile, when and only when it is determined that the past rendering of the first tile was performed in a manner that was independent from rendered values of adjacent tiles and the information for the present rendering describes the first tile in a manner that is independent from rendered values of adjacent tiles.

3. The method of claim 1, wherein determining whether the information for the present rendering describes the tile in a manner that is independent from the rendered values of adjacent tiles includes determining whether a color pass and a texture pass for the present tile rendering are independent of rendered values of adjacent tiles.

4. The method of claim 1, wherein performing all applicable dependent passes for the first tile provides a fully rendered first tile, the passes being applied to the first tile via a first memory, further including writing the fully rendered first tile from the first memory to a second memory, and once the first tile is written to the second memory, writing a second tile to the first memory.

5. The method of claim 4, further including performing all applicable dependent passes for the second tile to provide a fully rendered second tile, the passes being applied to the second tile via the first memory.

6. The method of claim 4, wherein the first memory is too small to store all rendered tiles of a completely rendered screen, and the second memory is large enough to store all rendered tiles of the completely rendered screen.

7. The method of claim 6, wherein the first memory is on chip with the processor.

8. The method of claim 1, further including storing an indication that the first tile was rendered in a manner that is independent of rendered values of other tiles.

9. The method of claim 1, further including:
   determining that information for a present rendering of a second tile describes the first second tile in a manner that is dependent on rendered values of one or more other tiles;
   performing a first rendering pass for the second tile; and
   performing a first rendering pass for a third tile subsequent to the first rendering pass for the second tile and prior to performing any subsequent dependent rendering passes for the second tile.

10. In a system comprising a processor performing tiled rendering, a method of providing tiled rendering of a screen including:
    determining whether past renderings of first and second tiles were performed in a manner that was independent from rendered values of adjacent tiles;
    performing a first present rendering pass to apply first properties to a first tile that is able to be rendered in a manner that is independent of rendered values of other tiles,
    performing a second present rendering pass to apply second properties to the first tile, present rendering being for a different frame than past renderings;
    the second rendering pass for the first tile being performed after the first rendering pass for the first tile and before any rendering passes are applied to any subsequent tile;
    performing a first rendering pass to apply first properties to a second tile that is not able to be rendered in a manner that is independent of rendered values of other tiles, and performing a second rendering pass to apply second properties to the second tile, the second rendering pass for the second tile being performed after the first rendering pass for the second tile and after at least one rendering pass is applied to a subsequent tile.

11. The method of claim 10, wherein the first and second rendering passes are performed to apply properties to tiles stored in a first memory, the tile being loaded into the first memory prior to performing the first rendering pass and being maintained in the first memory at all times between the performing of the first and second rendering passes.

12. The method of claim 11, wherein once the first tile is fully rendered, it is transferred from the first memory to a second memory.

13. The method of claim 12, wherein the second memory is large enough to hold a full screen worth of rendered tiles and the first memory is not large enough to hold a full screen worth of rendered tiles.

14. The method of claim 12, wherein the first memory is faster than the second memory.

15. A processor-readable medium having stored thereon non-transitory processor-executable instructions that, when executed by a processor, cause the processor to perform tiled rendering by:
    determining whether past renderings of first and second tiles were performed in a manner that was independent from rendered values of adjacent tiles;
    performing a first present rendering pass to apply first properties to a first tile that is able to be rendered in a manner that is independent of rendered values of other tiles, present rendering being for a frame that is different than a frame rendered by the past renderings;

performing a second present rendering pass to apply second properties to the first tile, the second rendering pass being performed after the first rendering pass and before any rendering passes are applied to any subsequent tile after the first rendering pass;

performing a first rendering pass to apply first properties to a second tile that is not able to be rendered in a manner that is independent of other tiles, and performing a second rendering pass to apply second properties to the second tile, the second rendering pass for the second tile being performed after the first rendering pass for the second tile and after at least one rendering pass is applied to a subsequent tile.

16. The processor-readable medium of claim 15, wherein the instructions further cause the processor to perform all applicable dependent passes for the first tile for a present rendering to provide a fully rendered first tile before performing any rendering passes on any subsequent tile.

17. The processor-readable medium of claim 16, wherein the instructions further cause the processor to transfer the fully rendered tile from a first memory to a second memory, and load a previously rendered second tile from the second memory to the first memory.

18. A system comprising:
a first storage device;
a second storage device, the second storage device having more storage capacity than the first storage device;
a processor coupled to the first and second storage devices and operative to:
determine whether past renderings of first and second tiles were performed in a manner that was independent from rendered values of adjacent tiles;
perform a first present rendering pass to apply first properties to a first tile that is able to be rendered in a manner that is independent of rendered values of other tiles, present rendering being for a frame that is different than a frame rendered by the past renderings;
perform a second present rendering pass to apply second properties to the first tile, the second rendering for the first tile pass being performed after the first rendering pass for the first tile and before any rendering passes are applied to any subsequent tile after the first rendering pass for the first tile;
perform a first rendering pass to apply first properties to a second tile that is not able to be rendered in a manner that is independent of rendered values of other tiles,
perform a second rendering pass to apply second properties to the second tile, the second rendering pass for the second tile being performed after the first rendering pass for the second tile and after at least one rendering pass is applied to a subsequent tile.

19. The system of claim 18, wherein the first tile is for a first screen and the processor is further operative to perform first and second rendering passes on the second tile for the first screen after all passes are completed for the first tile for the first screen.

* * * * *